(12) United States Patent
Ikunami (10) Patent No.: US 7,484,702 B2
(45) Date of Patent: Feb. 3, 2009

(54) TEMPORARY CLAMPING STRUCTURE FOR ELECTRONICS

(75) Inventor: Takahiro Ikunami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 286 days.

(21) Appl. No.: 10/421,914

(22) Filed: Apr. 24, 2003

(65) Prior Publication Data

US 2003/0213884 A1 Nov. 20, 2003

(30) Foreign Application Priority Data

May 16, 2002 (JP) ............................. 2002-142022

(51) Int. Cl.
A47B 91/00 (2006.01)
(52) U.S. Cl. ..................... 248/346.01; 248/222.11; 248/917; 345/905; 348/794; 312/223.2
(58) Field of Classification Search ................ 345/905, 345/903; 348/794, 373, 837, 838, 825; 248/346.01, 248/917, 222.11, 222.13, 222.12, 224.8, 248/225.21; 224/311; 296/37.8; 312/223.2, 312/246, 248, 7.2
See application file for complete search history.

(56) References Cited

U.S. PATENT DOCUMENTS

| | | | | | |
|---|---|---|---|---|---|
| 1,790,977 | A | * | 2/1931 | Boer ........................... | 224/547 |
| 4,148,454 | A | * | 4/1979 | Carlson et al. ......... | 248/222.11 |
| 4,256,280 | A | * | 3/1981 | McCutchen ............ | 248/223.41 |
| 4,317,416 | A | * | 3/1982 | Baum et al. ............. | 108/157.1 |
| 5,106,143 | A | * | 4/1992 | Soeters ..................... | 296/37.8 |
| 5,884,989 | A | * | 3/1999 | Truelove .................... | 312/245 |
| 5,980,007 | A | * | 11/1999 | Singh ...................... | 312/334.1 |
| 6,059,255 | A | * | 5/2000 | Rosen et al. ................ | 292/140 |
| 6,246,449 | B1 | * | 6/2001 | Rosen ......................... | 348/837 |
| 6,292,236 | B1 | | 9/2001 | Rosen | |
| 6,364,390 | B1 | * | 4/2002 | Finneman ................... | 296/37.7 |
| 6,396,551 | B1 | * | 5/2002 | Ogawa et al. ............... | 348/836 |
| 6,529,123 | B1 | * | 3/2003 | Paul, Jr. | |
| 6,561,600 | B1 | * | 5/2003 | Seeley et al. ............. | 312/257.1 |
| 6,719,343 | B2 | * | 4/2004 | Emerling et al. ......... | 296/24.34 |
| 2002/0140687 | A1 | * | 10/2002 | Takeda ........................ | 345/204 |

FOREIGN PATENT DOCUMENTS

| | | |
|---|---|---|
| DE | 94 13 254 U1 | 2/1996 |
| DE | 295 10 797 U1 | 11/1996 |

(Continued)

OTHER PUBLICATIONS

German Office Action dated Aug. 12, 2008, together with English translation.

*Primary Examiner*—Kimberly T Wood
(74) *Attorney, Agent, or Firm*—Sughrue Mion, PLLC (57) ABSTRACT

A temporary clamping structure for electronics includes a bracket fastened to a ceiling surface of the interior of a room, an electronic device body connected to the ceiling surface by screwing down to the bracket, fitting holes formed on the bracket side, and a fitting pawl provided on the electronic device body and fittable into the fitting holes. The temporary clamping structure for electronics is arranged such that the fitting pawl is unfixed from the fitting hole by bending the tip end of second protrusion of the electronic device body in the direction in which the second protrusion goes away from the first protrusion.

19 Claims, 11 Drawing Sheets

FOREIGN PATENT DOCUMENTS

| | | |
|---|---|---|
| DE | 196 12 843 A1 | 10/1997 |
| DE | 197 43 949 C1 | 11/1998 |
| DE | 197 53 879 C1 | 12/1998 |
| JP | 2-174475 A | 7/1990 |
| JP | 7-302507 A | 11/1995 |
| JP | 10-252948 A | 9/1998 |
| JP | 2000-019614 A | 1/2000 |
| JP | 2000-217045 A | 8/2000 |
| JP | 2000-261702 A | 9/2000 |
| JP | 2001-218131 A | 8/2001 |
| WO | WO96/18845 A1 | 6/1996 |

* cited by examiner

TEMPORARY CLAMPING STRUCTURE FOR ELECTRONICS

BACKGROUND OF THE INVENTION

1. Field of the Invention

The present invention relates to a temporary clamping structure for electronics, installed in the interior of a room of movable bodies such as a motor vehicle, an electric train, and a ship, for instance, for installing a display (electronics) on one side in the interior of the room, such as a liquid crystal television monitor (hereinafter referred to as a TV monitor).

2. Description of the Related Art

Conventionally, as electronics of this type, there has been generally known an on-vehicle display monitor fastened in an openable and closable manner to the ceiling of the passenger room of a motor vehicle.

Figure 17:
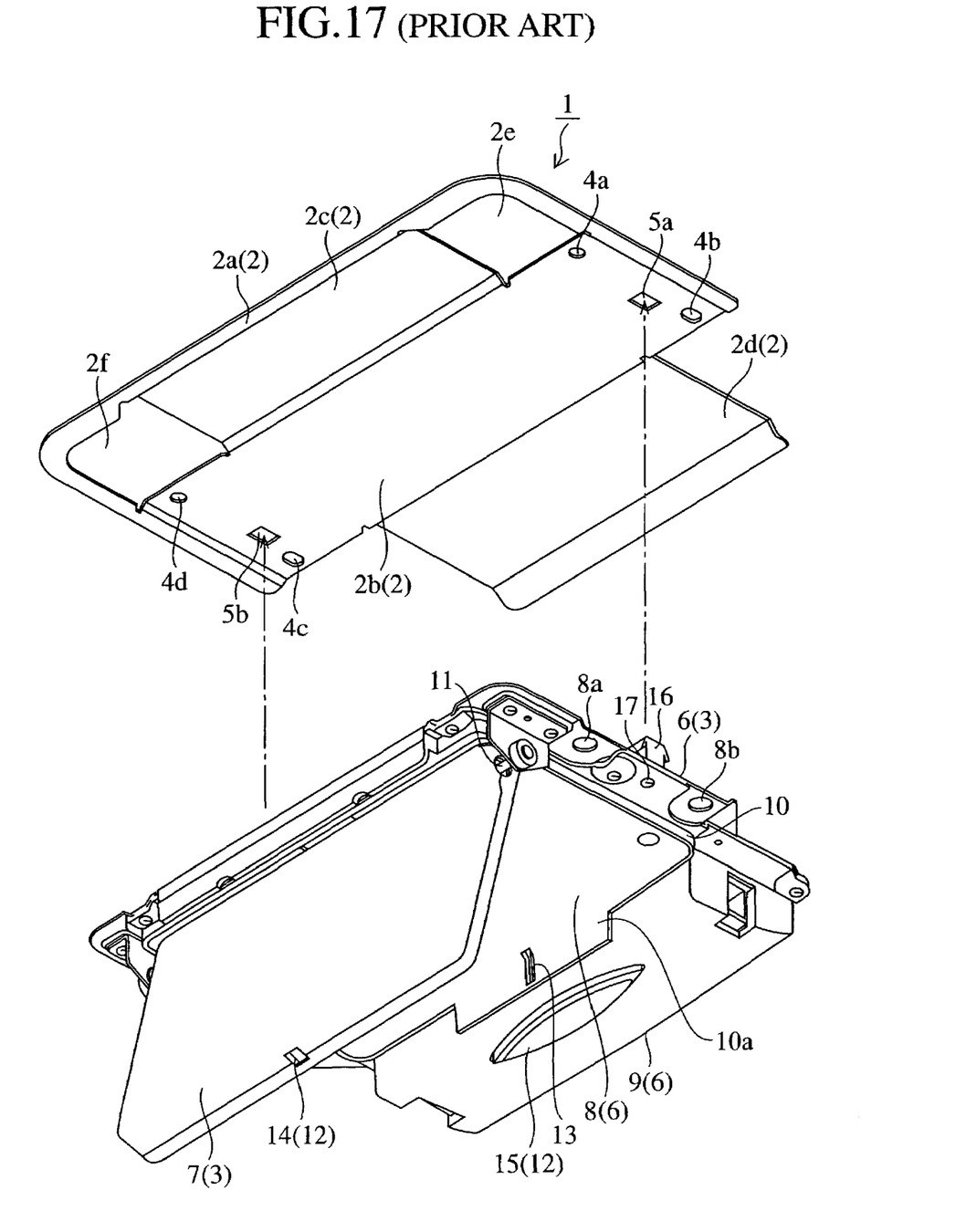
FIG. 17 is an exploded perspective view showing the configuration of the conventional on-vehicle display monitor.
Figure 18:
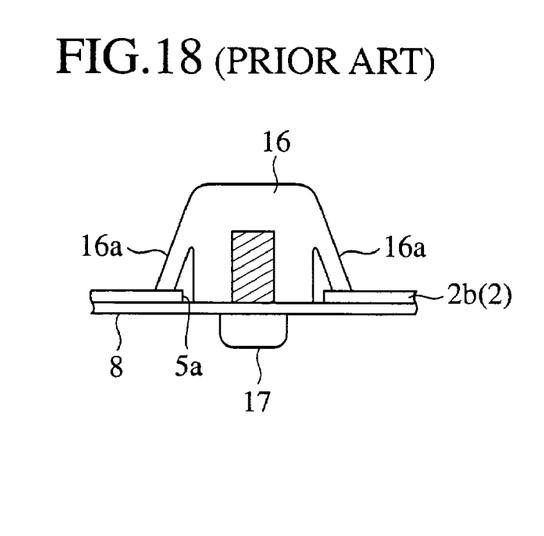
FIG. 18 is an enlarged front view showing the clamping structure of the on-vehicle display monitor shown in FIG. 17.

FIG. 17 is an exploded perspective view showing the configuration of a conventional on-vehicle display monitor. FIG. 18 is an enlarged front view showing the clamping structure of the on-vehicle monitor shown in FIG. 17.

Referring to FIG. 17 and FIG. 18, reference numeral 1 denotes an on-vehicle display monitor, which is generally composed of a vehicle-side sheet metal bracket (hereinafter referred to as a bracket) 2 and an electronic device body 3. The bracket 2 is generally composed of a virtually U-shaped frame 2a, a virtually rectangular monitor mounting part 2b provided within this frame 2a, a virtually rectangular first supporting part 2c extending to the center of the frame 2a along the ceiling surface of the vehicle (not shown) after once bends to the ceiling surface of the vehicle (not shown) side from one lengthwise side of this monitor mounting part 2b, and a virtually rectangular second supporting part 2d extending along the ceiling surface of the vehicle (not shown) after once bends to the ceiling surface of the vehicle (not shown) side from the other lengthwise side of the monitor mounting part 2b. A space is formed between the monitor mounting part 2b and the ceiling surface of the vehicle (not shown). Moreover, openings 2e and 2f are formed between the frame 2a, the monitor mounting part 2b, and the first supporting part 2c. Tapped holes 4a, 4b, 4c, and 4d are formed in the four corners of the monitor mounting part 2b, and grommet insertion holes 5a, 5b opened in rectangular cross-section form between the tapped holes 4a, 4b, and between the tapped holes 4c, 4d, respectively.

The electronic device body 3 is generally composed of a monitor casing 6 directly screwed down to the monitor mounting part 2b of the bracket 2 and a TV monitor 7 rotatably supported relative to the monitor casing 6. The monitor casing 6 is generally composed of a tabular clamping part 8 to clamp the bracket 2 and an operating part 9 provided on the clamping part 8 and having a mechanism to mechanically or electrically operate the TV monitor 7. In the clamping part 8, there are formed four tapped holes 8a, 8b (two remaining tapped holes are not shown) each corresponding to the four tapped holes 4a, 4b, 4c and 4d located on the bracket 2 side. In an about half area of the undersurface of the clamping part 8, there is provided a housing surrounding wall 10 to house therein the TV monitor 7, and a central partition wall 10a thereof is adjacent to the operating part 9. Furthermore, on the undersurface of the clamping part 8, a rotating shaft 11 to rotatably support the TV monitor 7 is provided in the farthest location from the central partition wall 10a. In addition, in the operating part 9, there is provided an engaging mechanism 12 to engage the TV monitor 7 housed within the housing surrounding wall 10 (closed state). This engaging mechanism 12 is generally composed of an engaging pawl (not shown) that engages with a concavity 14 formed on a front end face 7a of the TV monitor 7, through an opening 13 formed in the central partition wall 10a and a push button 15 to release the engagement of the engaging pawl with the concavity 14.

Rectangular cross-section grommets 16 are screwed between the four tapped holes 8a in the clamping part 8 of the electronic device body 3 by screws 17. Each of the grommets 16 has a pair of fitting pawls 16a as shown in FIG. 18.

The method of mounting the conventional on-vehicle display monitor 1 will now be described below.

First of all, after the bracket 2 is fastened to the main base sheet metal (not shown) of the ceiling surface of the vehicle (not shown), the grommets 16 of the electronic device body 3 are inserted into the grommet insertion holes 5a, 5b on the bracket 2 side. The fitting pawls 16a of the grommets 16 are closed when the pawls pass through the grommet insertion holes 5a and 5b, and they are opened after having passed therethrough to fit the grommets 16 into the grommet insertion holes 5a, 5b. This fitting temporarily clamps the electronic device body 3 to the bracket 2.

Subsequently, in the above-mentioned temporarily clamped state, the tapped holes 8a, etc. on the electronic device body 3 side and the tapped holes 4a, etc. on the bracket 2 side are screwed down by screws (not shown). By going through the above procedures, the mounting work is completed.

However, the conventional mounting of the on-vehicle display monitor thus carried out as above enables a relatively easy mounting of the electronic device body 3 on the bracket 2, but a detachment work thereof is not necessarily easy in contradiction thereto. That is, when detaching the electronic device body 3 for repair or exchange, for instance, complicated works entail, involving unscrew of the screws (not shown) screwed down into the tapped holes 4a, etc. on the bracket side and the tapped holes 8a, etc on the electronic device body side, and removal of the grommets 16 from the main base sheet metal (not shown) after the screws 17 have unscrewed.

SUMMARY OF THE INVENTION

The present invention has been made to solve the above-mentioned problem. An object of the present invention is to provide a temporary clamping structure for electronics having an easily attachable and detachable structure to/from the mounting part.

The temporary clamping structure for electronics according to the present invention includes a bracket fastened to one side in the interior of a room; an electronic device body connected to the side in the interior of the room by fixing on the bracket; a fitting concavity formed in either of the electronic device body and the bracket; and a fitting convexity formed in the other side and fittable into the fitting concavity.

Therefore, according to the present invention, it allows an easy temporary clamping on the bracket by the fitting of the fitting concavity into the fitting convexity, and permits an easy detachment of the electronic device body from the bracket by releasing the fitting.

DETAILED DESCRIPTION OF THE PREFERRED EMBODIMENTS

Preferred embodiments of the present invention will now be described in detail with reference with the attached drawings.

First Embodiment

Figure 1:
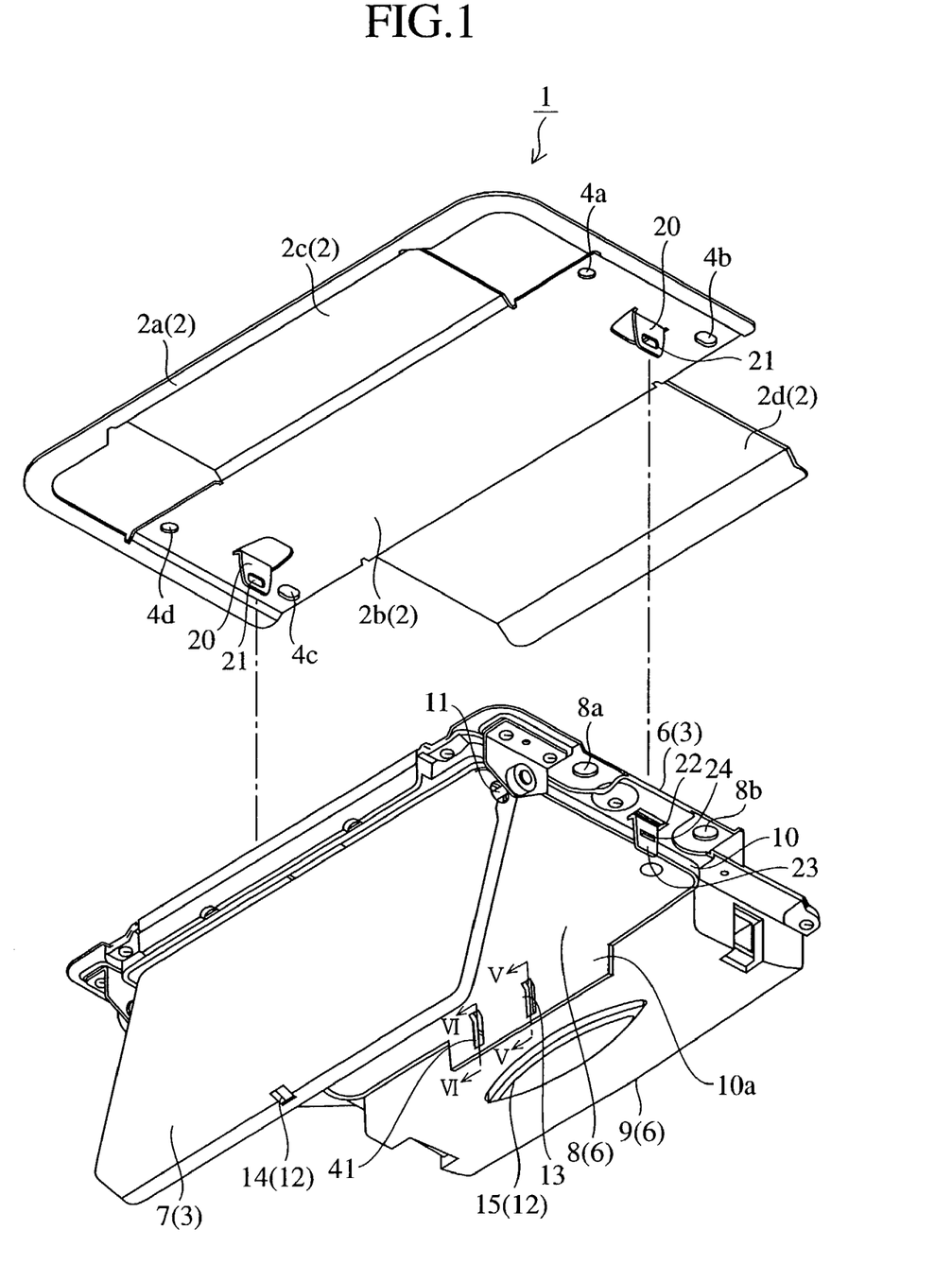
FIG. 1 is an exploded perspective view showing the configuration of the on-vehicle display monitor according to a first embodiment.
Figure 2:
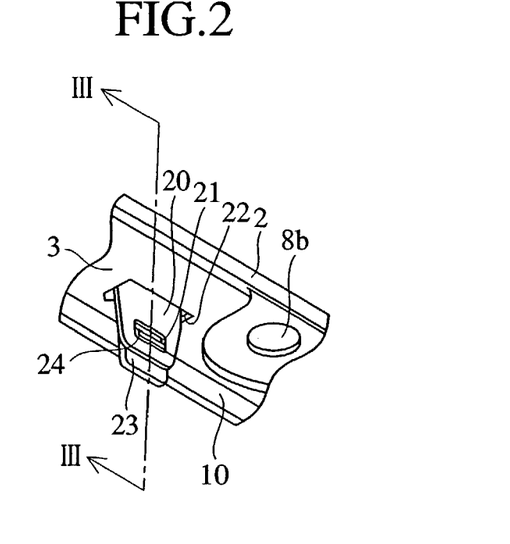
FIG. 2 is an enlarged perspective view showing the fitting structure of the on-vehicle display monitor shown in FIG. 1.
Figure 3:
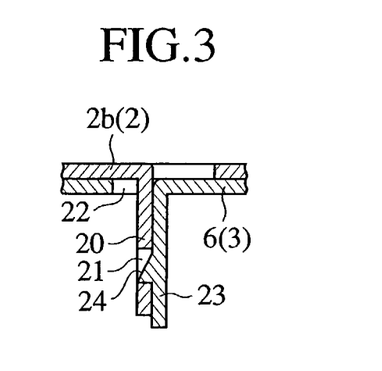
FIG. 3 is a sectional view taken along the line III-III in FIG. 2.
Figure 4A:
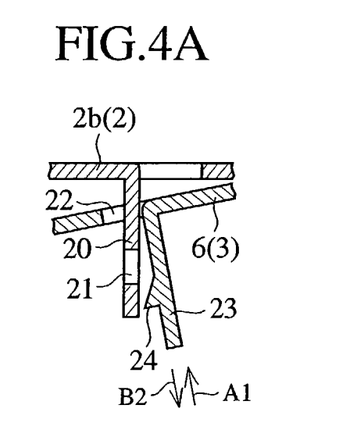
FIG. 4A is a sectional view for explaining an operation of the fitting and release.
Figure 4B:
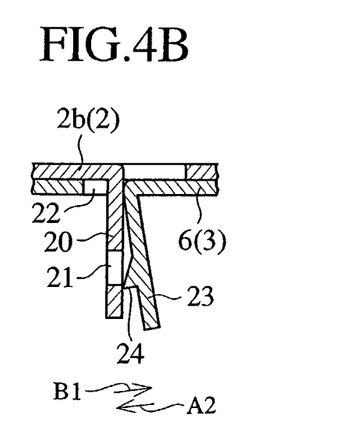
FIG. 4B is a sectional view for explaining an operation of the fitting and release.

FIG. 1 is an exploded perspective view showing the configuration of the on-vehicle display monitor according to the first embodiment. FIG. 2 is an enlarged perspective view showing the fitting structure of the on-vehicle display monitor shown in FIG. 1. FIG. 3 is sectional view taken along the line III-III in FIG. 2. FIG. 4A is a sectional view for explaining an operation of the fitting and release. FIG. 4B is a sectional view for explaining an operation of the fitting and release.

Figure 5:
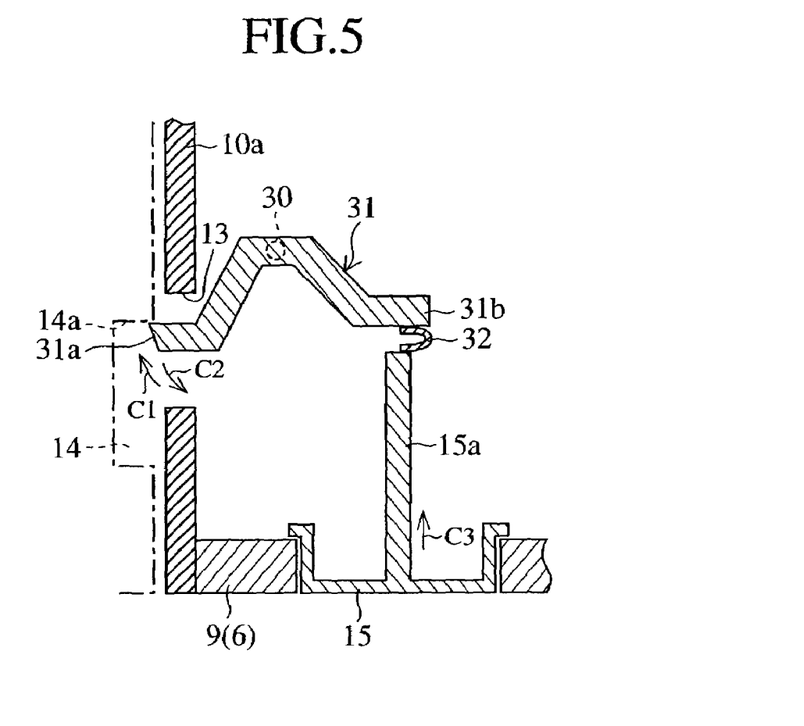
FIG. 5 is a sectional view showing the configuration of the monitor opening and closing mechanism taken along the line V-V in FIG. 1.
Figure 6:
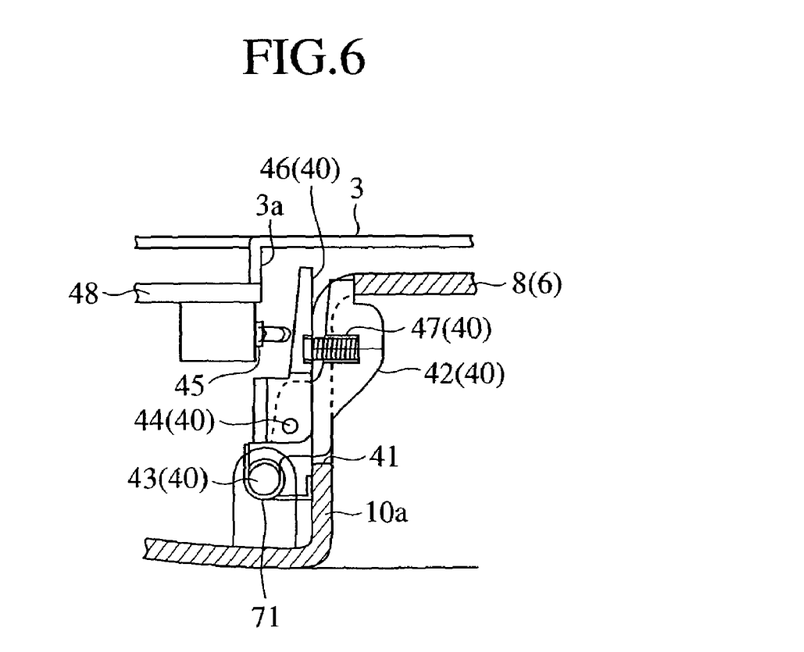
FIG. 6 is a sectional view showing the configuration of the monitor opening and closing detection lever taken along the line VI-VI in FIG. 1.
Figure 7:
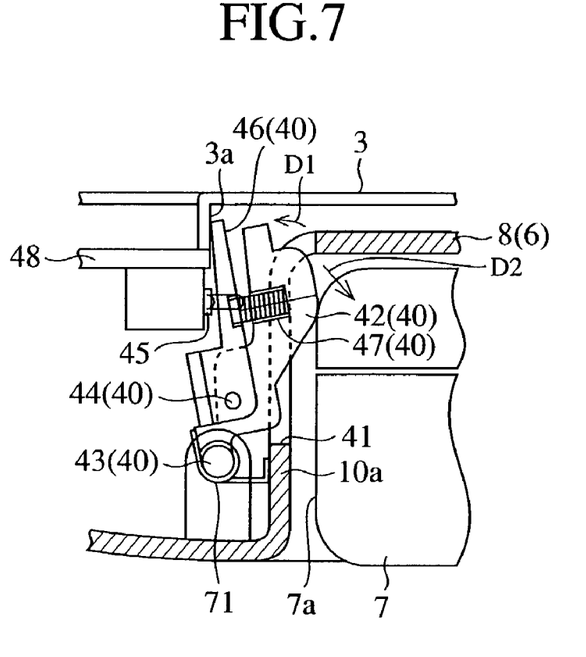
FIG. 7 is a sectional view showing the configuration of the monitor opening and closing detection lever positioned in a proper reference position.
Figure 8:
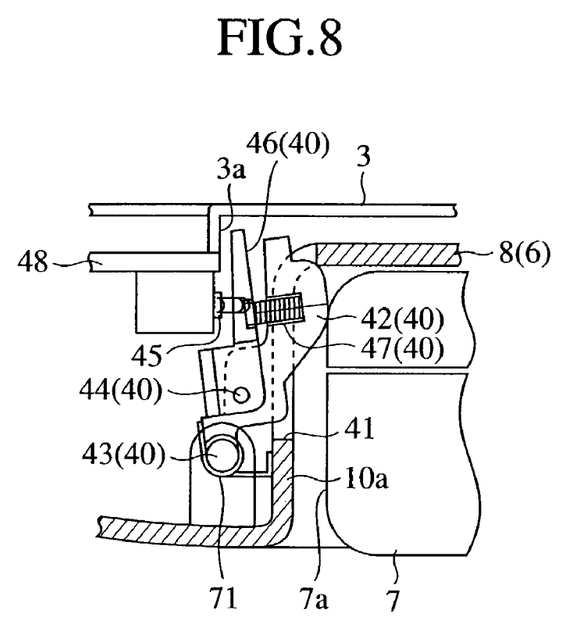
FIG. 8 is a sectional view showing the configuration of the monitor opening and closing detection lever positioned in a position corresponding to the monitor gone away farthest from the proper reference position.
Figure 9:
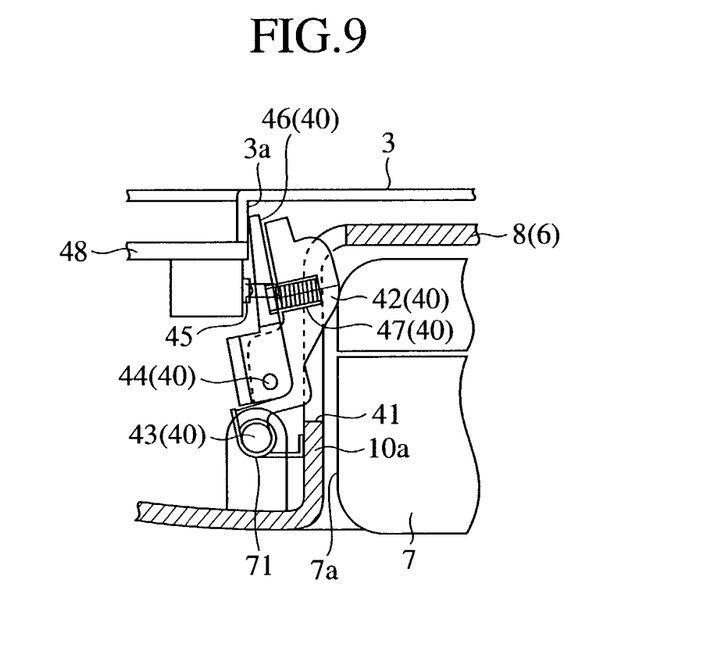
FIG. 9 is a sectional view showing the configuration of the monitor opening and closing detection lever positioned in the position corresponding to the monitor came up closest to the proper reference position.

FIG. 5 is a sectional view showing the configuration of the monitor opening and closing mechanism taken along the line V-V in FIG. 1. FIG. 6 is a sectional view showing the configuration of the monitor opening and closing detection lever taken along the line VI-VI in FIG. 1. FIG. 7 is a sectional view showing the configuration of the monitor opening and closing detection lever positioned in the proper reference position. FIG. 8 is a sectional view showing the configuration of the monitor opening and closing detection lever positioned in the position corresponding to the monitor gone away farthest from the proper reference position. FIG. 9 is a sectional view showing the configuration of the monitor opening and closing detection lever positioned in the position corresponding to the monitor came up closest to the proper reference position.

The same reference numerals of the on-vehicle display monitor according to the first embodiment as those of the conventional on-vehicle display monitor shown in FIG. 17 and FIG. 18 indicate the same components, and therefore descriptions thereof are omitted for brevity's sake.

On a bracket 2 in the first embodiment, there are provided a pair of first lugs (first protrusions) 20 that project toward the passenger room side. Each of the first lugs 20 has an fitting hole (fitting concavity) 21 formed thereon in generally rectangular shape. On the other hand, on a monitor casing 6 of an electronic device body 3, a pair of through holes 22 are formed, into which the first lug 20 provided on the bracket 2 is insertable. At the positions adjacent to each through hole 22, a pair of second lugs (second protrusions) 23 are provided that project toward the passenger room side, each integrally molded with the monitor casing 6. Each of the second lugs 23 has an fitting pawl (fitting convexity) 24 fittable from the inside with the fitting hole 21 on the bracket 2 side.

In the first embodiment, the dimension from the tip end (lower end on mounting) of the second lug 23 to the fitting pawl 24 is made longer than that from the tip end (lower end on mounting) of the first lug 20 to the fitting hole 21. Therefore, in the fitted state, only the tip end of the second lug 23 projects from the tip end of first lug 20 as shown in FIG. 2.

The method of mounting the on-vehicle display monitor 1 of the first embodiment will now be described below.

After the bracket 2 has fastened to the main base sheet metal (not shown) of the ceiling surface of the vehicle (not shown), the electronic device body 3 is lifted such that the first lug 20 of the bracket 2 are each inserted into the through holes 22 corresponding to the lugs. At this time, the fitting pawl 24 of the second lug 23 of the electronic device body 3 is brought into close to the fitting hole 21 from the tip end side of the first lug 20 of the bracket 2 in the direction shown by an arrow A1 in FIG. 4A in order to bend inwardly the second lug 23 of the electronic device body 3 as much as the height of the engaging pawl 24. When the fitting pawl 24 is in a position opposed to the fitting hole 21, the fitting pawl 24 is fitted into the fitting hole 21 in the direction shown by an arrow A2 in FIG. 4B by the aid of the elastic repulsive force of the second lug 23. This fitting temporarily clamps the electronic device body 3 to the bracket 2.

Subsequently, in the above-mentioned temporarily clamped state, the tapped holes 8a, etc. on the electronic device body side and the tapped holes 4a, etc. on the bracket side are screwed down by screws (not shown). By going through the above procedures, the mounting operation is completed.

The method of detaching the on-vehicle display monitor 1 of the first embodiment will next be described below.

First of all, the screws (not shown) screwed down into the tapped holes 4a, etc. on the bracket 2 side and the tapped holes 8a, etc. on the electronic device body 3 side are unscrewed.

After that, by pushing the tip end of at least one of the second lugs 23 of the electronic device body 3 in the direction shown by an arrow B1 in FIG. 4B using an operator's finger, for instance, the second lug 23 is bent inwardly to release the fitting pawl 24 from the fitting hole 21 (unfix). Subsequently, the electronic device body 3 is pulled down in the direction (in the gravitational direction) shown by an arrow B2 in FIG. 4A to unfix the fitting pawl 24 of the second lug 23 from the tip end side of the first lug 20. By going through the above procedures, the detaching operation is completed.

Next, the configuration of the monitor opening and closing mechanism in the electronic device body 3 will be described by reference to FIG. 1 and FIG. 5.

Referring to FIG. 1 and FIG. 5, reference numeral 30 denotes a rotating shaft (monitor opening and closing mechanism) disposed in the monitor casing 6 of the electronic device body 3, and 31 denotes a monitor engaging member (monitor opening and closing mechanism) rotatably supported by the rotating shaft 30. The monitor engaging member 31 is generally composed of engaging pawl 31a that is able to engage with the top surface 14a of the concavity 14 formed on the TV monitor 7 and the supporting part 31b provided on the opposite side to the engaging pawl 31a with respect to the rotating shaft 30. The engaging pawl 31a of the monitor engaging member 31 slightly projects from an opening 13 of the monitor casing 6 (reference position). The supporting part 31b of the monitor engaging member 31 is connected with a supporting rod 15a of a push button 15 (monitor opening and closing mechanism) through a flexible member 32 (monitor opening and closing mechanism) curved in a U-shaped cross section form, for instance.

The operation of the monitor opening and closing mechanism will now be described below.

When the TV monitor 7 is in use (opened state), the monitor engaging member 31 stands in the above-mentioned reference position. Here, when housing the TV monitor 7 in the monitor casing 6, front end face 7a of the TV monitor 7 pushes up the engaging pawl 31a of the monitor engaging member 31. At this time, because the monitor engaging member 31 rotates as much as the bending of the flexible member 32 in a direction shown by an arrow C1 in FIG. 5, the monitor engaging member 32 slightly retreats from the front end face 7a of the TV monitor 7 as the TV monitor 7 moves upward. In addition, when the TV monitor 7 is pushed up, the engaging pawl 31a of the monitor engaging member 31 slidingly contacts the front end face 7a of the TV monitor 7, and gets into the concavity 14 of the TV monitor 7. At this time, the monitor engaging member 31 rotates by restoring force of the flexible member 32 in the direction shown by an arrow C2 in FIG. 5, and returns to the above-described reference position. Because the engaging pawl 31a of the monitor engaging member 31 standing at the reference position slightly projects from the opening 13 of the electronic device body 3, upon stopping pushing up the TV monitor 7, the engaging pawl 31a engages with the top surface 14a of the concavity 14 of the TV monitor 7 as shown in FIG. 5. As a result, the TV monitor 7 is maintained with the monitor housed within the housing surrounding wall 10 (closed state).

When putting the TV monitor 7 in use, the push button 15 is pushed up in the direction (upward) shown by an arrow C3 in FIG. 5. This push-up force is transmitted to the supporting part 31b of the monitor engaging member 31 through the flexible member 32, and rotates the monitor engaging member 31 in the direction shown by an arrow C2. Since this rotation causes the engaging pawl 31a of the monitor engaging member 31 to get out from the top surface 14a of the concavity 14 of the TV monitor 7, the TV monitor 7 rotates by gravity (unlock). This droops the TV monitor 7 and puts it in use (opened state).

The configuration of the monitor opening and closing detection lever of the electronic device body 3 will be described by reference to FIG. 6 and FIG. 7.

The monitor opening and closing detection lever 40 is provided in the operating part 9 of the monitor casing 6. As shown in FIG. 6, the monitor opening and closing detection lever 40 is generally composed of a first lever (first abutting part) 42 that is able to abut against the front end face 7a of the TV monitor 7 housed within the housing surrounding wall 10 through an opening 41 formed in a central partition wall 10a of a clamping part 8, a rotating shaft 43 rotatably supporting the first lever 42, a second lever (second abutting part) 46 that is able to abut against a power switch 45 that is rotatably supported by a rotating shaft 44 provided within the first lever 42 itself and is disposed within the operating part 9, and a spring 47 (elastic means), disposed between the first lever 42 and the second lever 46, for adjusting the clearance therebetween. The monitor opening and closing detection lever 40 is arranged such that when the TV monitor 7 is in use, the first lever 42 comes in the housing surrounding wall 10 through the opening 41 by rotating it around the rotating shaft 43 by the aid of elastic repulsion force of the spring 71, and when the TV monitor 7 is closed, the first lever 42 abuts against the front end face 7a of the TV monitor 7. In this case, the second lever 46 is apart from the power switch 45. The power switch 45 is fixed on a printed board 48 covered by the operating part 9.

The operation of the monitor opening and closing detection part will now be described below.

First of all, when pushing up the TV monitor 7 to close the TV monitor 7, the front end face 7a of the TV monitor 7 abuts against the first lever 42 of the monitor opening and closing detection lever 40 and thrusts this first lever 42. This thrust force causes the first lever 42 to rotate in the direction shown by an arrow D1 in FIG. 7, and also the second lever 46 through the spring 47. When the second lever 46 abuts against the power switch 45 and pushes this switch, an operation of the TV monitor 7 is suspended, with the result that the power is shut off as a consequence of a judgement that the TV monitor 7 is being closed. The abutment of the second lever 46 against the abutment surface 3a abutting against the printed board 48 of the bracket 2 stops the rotation of the second lever 46. Under such a condition, the TV monitor 7 is engaged with the monitor engaging member 31 of the above monitor opening and closing mechanism. Abutting the second lever 46 against the abutment surface 3a in order to stop it imposes no load on the power switch 45 and securely prevents the destruction of the power switch 45, or the like.

Then, when pushing up the push button 15 to release the engagement of the TV monitor 7 and the monitor engaging member 31, the TV monitor 7 begins falling down by gravity. At this time, because the first lever 42 is urged in the direction shown by an arrow D2 in FIG. 7 by elastic repulsion force of the compressed spring 71, the first lever 42 rotates following the TV monitor 7 and thrusts the TV monitor 7 in the rotating direction. This discharges the TV monitor 7 from the first lever 42, and stops after rotation at the drooping position. Meanwhile, because the second lever 46 rotates as well in the direction shown by an arrow D2 and parts from the power switch 45, turning on the power. That is, when the TV monitor 7 is in use, the power is automatically turned on.

There is a possibility of slight variations in the clearance between the front end face 7a of the clamped TV monitor 7 and the central partition wall 10a of the monitor casing 6 because of the positional tolerance of each part. In this event, if the above-mentioned clearance is shorter than the proper dimension, the thrust force becomes too large, and this large thrust force produces the deformations of the boards and terminals adjacent to the power switch 45 when the power switch 45 is pushed by the monitor opening and closing detection lever 40. In the worst case, a contact failure might be caused. On the contrary, if the above-mentioned clearance is longer than the proper dimension, the monitor opening and closing detection lever 40 is short of rotation, which obstructs securely pushing the power switch 45. Thus, the opening and closing of the TV monitor 7 could not be detected. For this reason, a proper adjustment of the position of the monitor opening and closing detection lever 40 is necessitated in accordance with the clearance. That is, assuming that the position of the TV monitor 7 located at the clearance shown in FIG. 7 is the proper reference position, in the case where TV monitor 7 goes away outwardly, for instance by 1 mm at the maximum, from the proper reference position relative to the central partition wall 10a, the power switch 45 is pushed in the situation that the clearance between the first lever 42 and the second lever 46 is large as shown in FIG. 8. On the other hand, in the case where the TV monitor 7 goes away inwardly, for instance by 1 mm at the maximum, from the proper reference position relative to the central partition wall 10a, the spring 47 is compressed as shown in FIG. 9 so as to reduce the clearance between the first lever 42 and the second lever 46.

As mentioned above, according to the first embodiment, the temporary clamping structure for electronics comprises the bracket 2 fastened to the ceiling surface (not shown) of the passenger room in a vehicle, the electronic device body 3 connected with the ceiling surface of the passenger room by screwing down on the bracket 2, the fitting hole 21 formed on the bracket 2 side, and the fitting pawl 24 fittable into the fitting hole 21 formed on the electronic device body 3 side. This easily temporarily clamps the electronic device body on the bracket 2 by the fitting of the fitting hole 21 and the fitting pawl 24, and easily detaches the electronic device body 3 from the bracket 2 by releasing the fitting. Therefore, the temporarily clamping structure of the electronics for the present invention facilitates easy attachment and detachment of the electronics.

Further, since in the first embodiment the temporary clamping structure for electronics is arranged such that the bracket 2 is a sheet metal member having formed thereon the fitting hole 21, and the electronic device body 3 is an elastic resin member integrally molded with the fitting pawl 24, the fitting pawl 24 can be easily engaged with the fitting hole 21 by using the elastic force. In addition, since the temporary clamping structure for electronics is arranged such that the electronic device body is an integrally molded article, the manufacturing cost can be reduced.

Further, in the first embodiment the temporary clamping structure for electronics is arranged such that the first lug 20 having the fitting hole 21 formed in the bracket 2, the second lug 23 having the fitting pawl 24 provided in the electronic device body 3, and the dimension from the tip end of the second lug 23 to the fitting pawl 24 is longer than that from the tip end of the first lug 20 to the fitting hole 21, which easily releases the fitting of the fitting hole 21 and the fitting pawl 24 by bending the tip end of the second lug 23 that is longer than the first lug 20 in the direction in which the tip end of the second lug 23 goes away from the first lug 20. This allows easy detachment of the electronic device body 3 from the bracket 2.

While in the first embodiment the temporary clamping structure for electronics is arranged such that the fitting hole 21 is formed on the bracket 2 side, and the fitting pawl 24 is provided on the electronic device body 3 side, the fitting hole 21 may conversely be formed on the electronic device body 3 side, and the fitting pawl 24 on the bracket 2 side.

Furthermore, in the first embodiment the temporary clamping structure for electronics is arranged such that in the electronic device body 3, there are provided the monitor casing 6 connectable to the bracket 2, the TV monitor 7 rotatably supported by the monitor casing 6, and the monitor opening and closing detection lever 40, provided on the monitor casing 6, for detecting that the TV monitor 7 is closed to turn off the power, and for detecting that the TV monitor 7 is opened to turn on the power. This automatically turns off the power the instant that the TV monitor 7 is closed, thereby saving electricity.

Moreover, in the first embodiment the temporary clamping structure for electronics is arranged such that in the monitor opening and closing detection lever 40, there are provided the first lever 42 that abuts against the TV monitor 7, the second lever 46 that abuts against the power switch 45, and the spring 47, disposed between the second lever 46 and the first lever 42, for adjusting the clearance between the first lever 42 and the second lever 46, and the second lever 46 that abuts against the abutment surface 3a of the electronic device body 3 in order to stop it. This intercepts the transmission of impact to the power switch 45, and securely prevents the occurrence of the contact failure caused by the deformations of the board, the terminals and the like of the power switch 45. Moreover, even if the position where the TV monitor 7 abuts against the first lever 42 is changed due to the positional tolerance of the parts, the elastic force of the spring 47 absorbs a change in the pushing amount of the parts due to the positional tolerance of the parts. This guarantees to securely push the power switch 45, even if the abutting position of the TV monitor 7 and the first lever 42 goes away from or up to the reference position.

Moreover, since in the first embodiment the electronic device body 3 has the monitor opening and closing mechanism for holding and releasing the TV monitor 7, the TV monitor 7 can be easily opened and closed.

Second Embodiment

Figure 10:
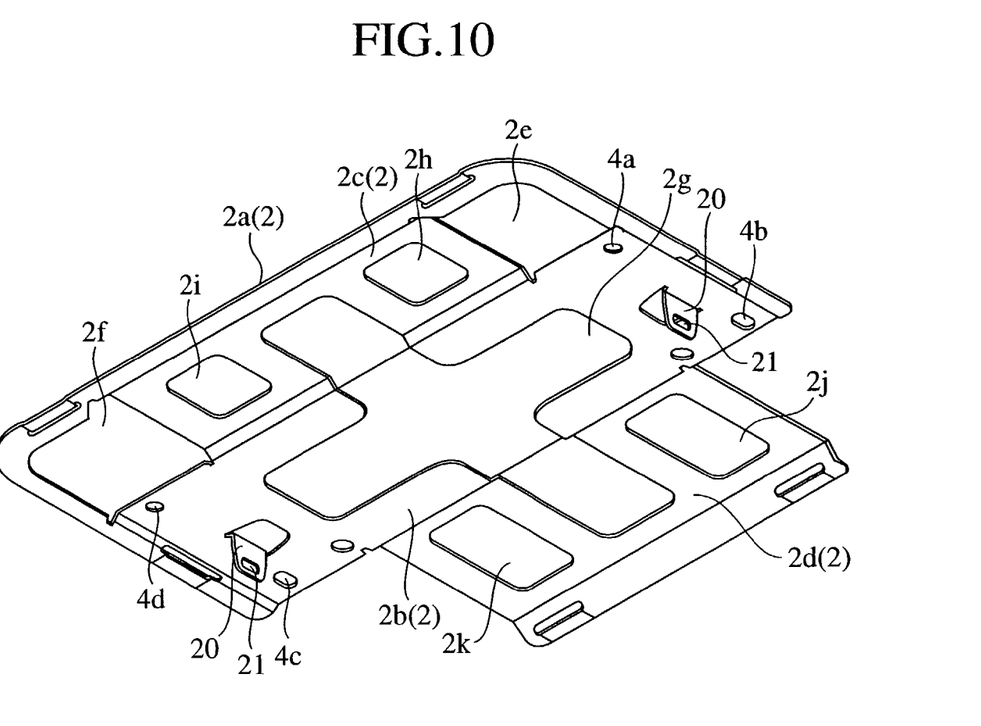
FIG. 10 is a perspective view showing the configuration of the bracket in the on-vehicle display monitor according to a second embodiment.
Figure 11:
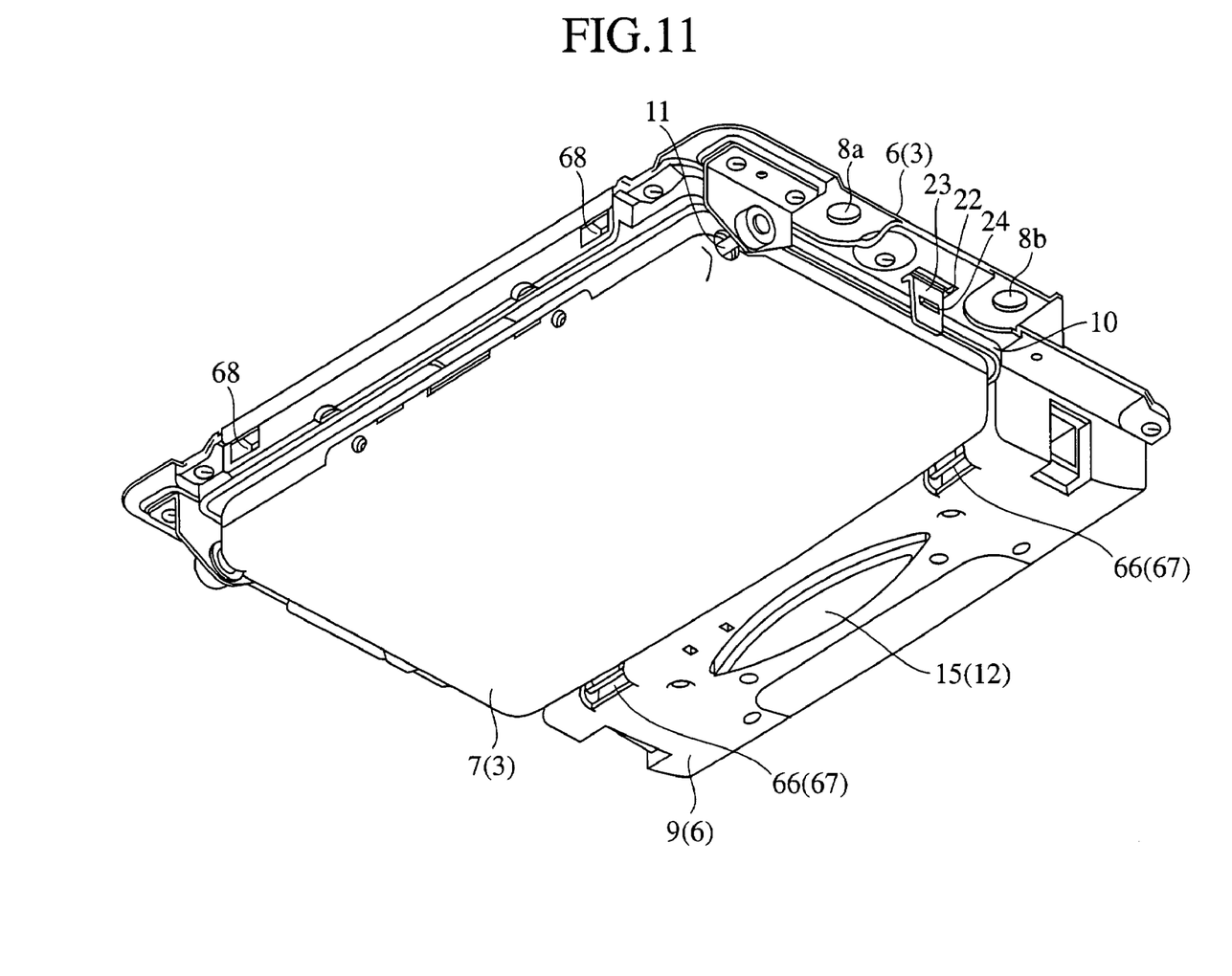
FIG. 11 is a perspective view showing the configuration of the electronic device body connectable to the bracket shown in FIG. 10.
Figure 12:
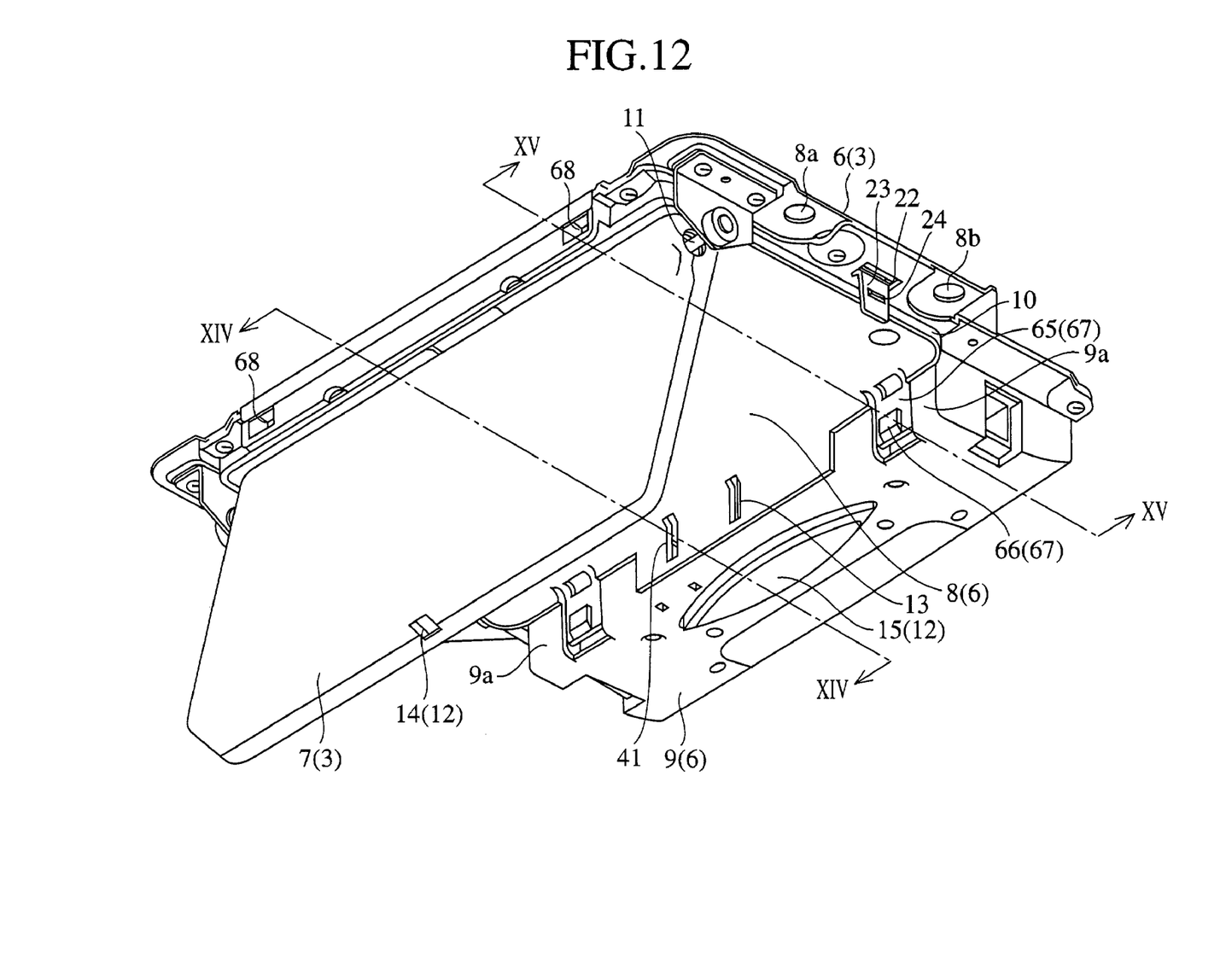
FIG. 12 is a perspective view showing the internal configuration of the monitor casing with the monitor of the electronic device body shown in FIG. 11 held open.
Figure 13:
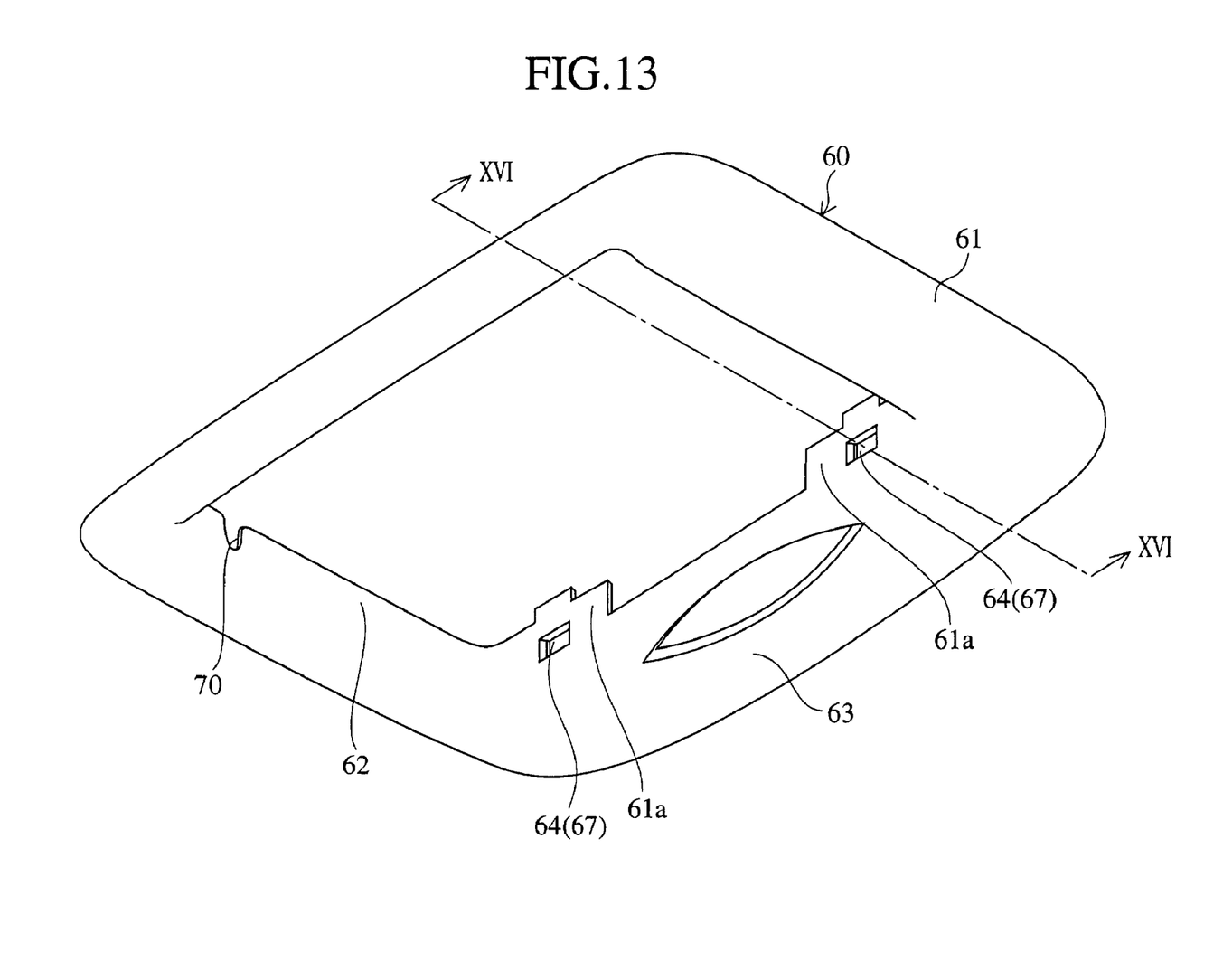
FIG. 13 is a perspective view showing the configuration of the cover connectable to the electronic device body shown in FIG. 11.
Figure 14:
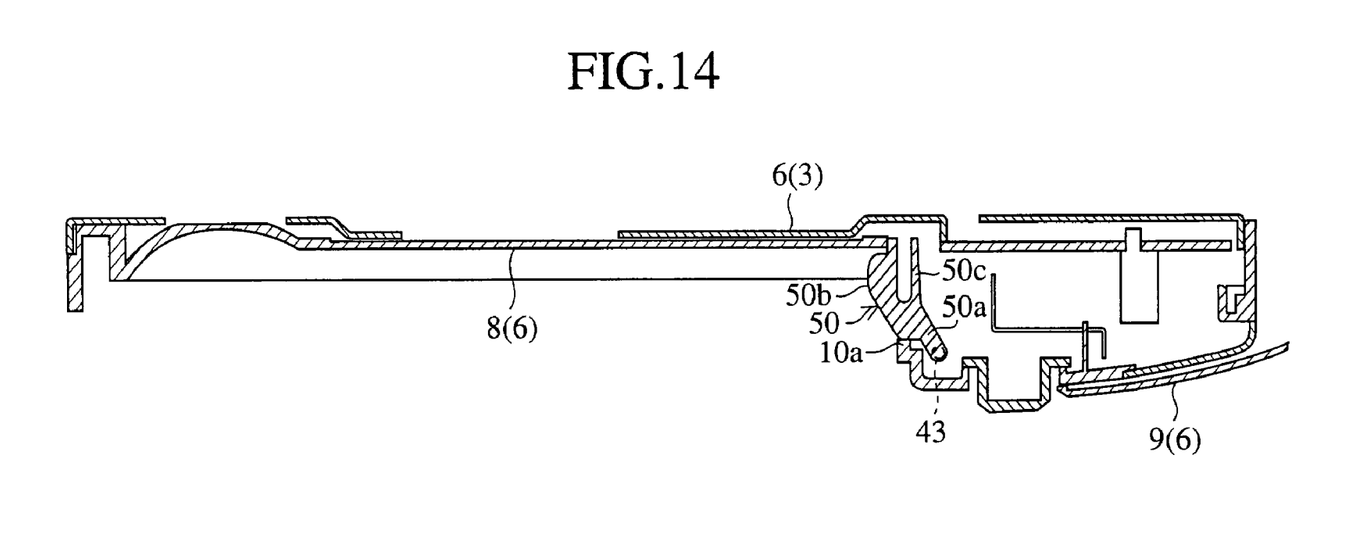
FIG. 14 is a sectional view showing the configuration of the monitor opening and closing detection lever taken along the line XIV-XIV in FIG. 12.
Figure 15:
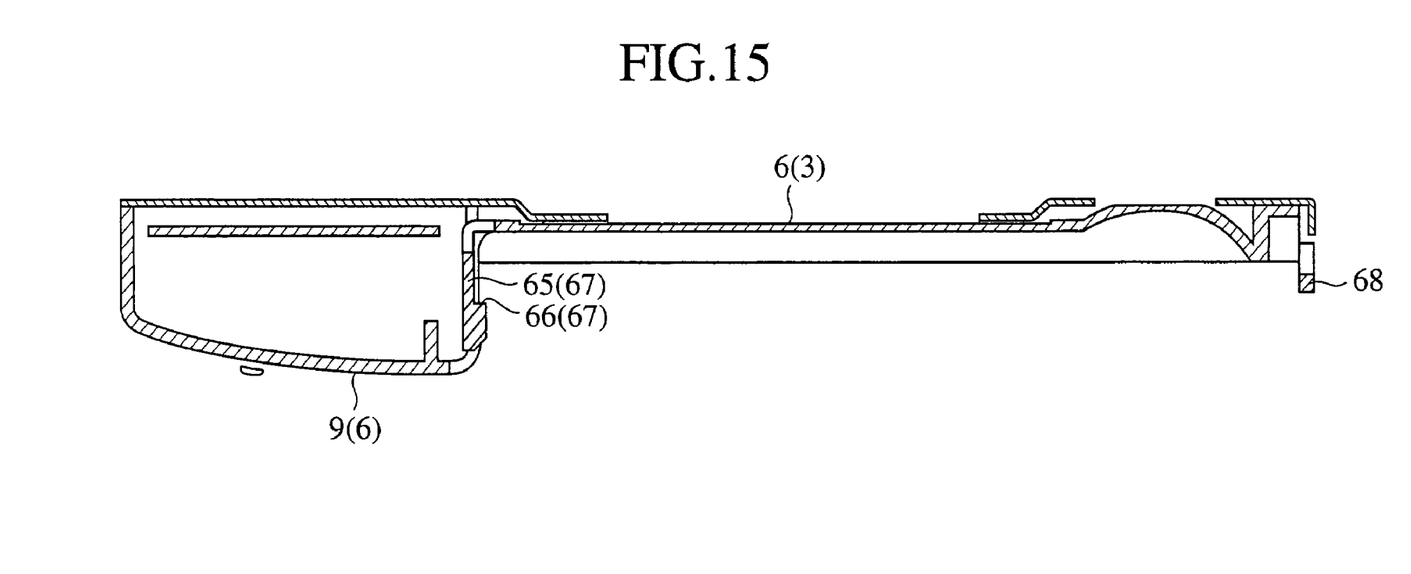
FIG. 15 is a sectional view showing the male engaging part of the cover attaching and detaching mechanism taken along the line XV-XV in FIG. 12.
Figure 16:
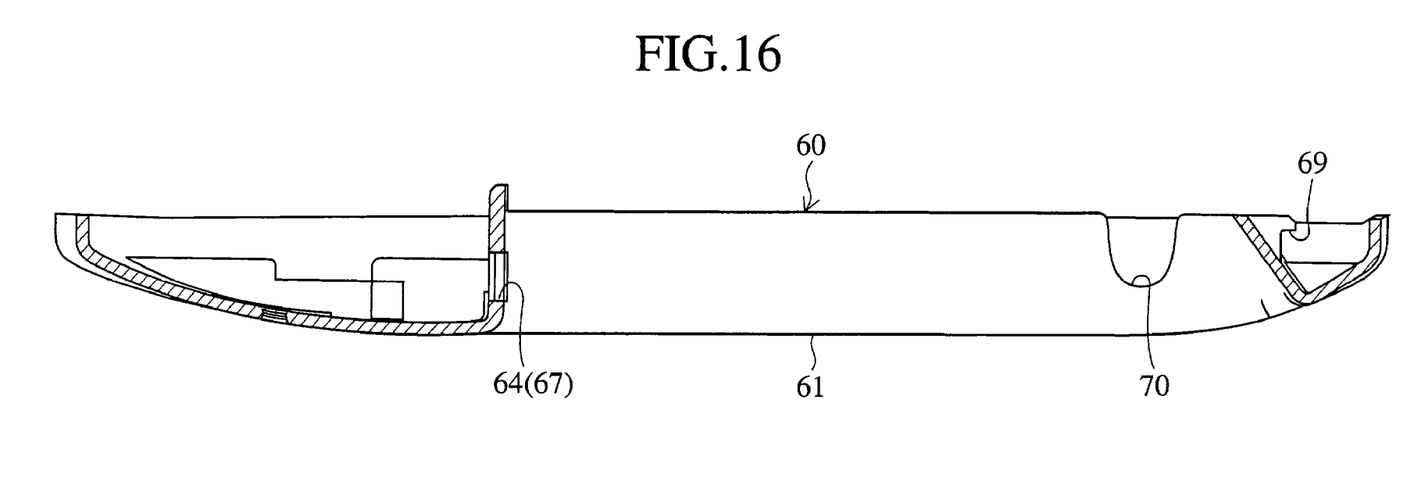
FIG. 16 is a sectional view showing the female engaging part of the cover attaching and detaching mechanism taken along the line XVI-XVI in FIG. 13.

FIG. 10 is a perspective view showing the configuration of the bracket in the on-vehicle display monitor according to the second embodiment. FIG. 11 is a perspective view showing the configuration of the electronic device body connectable to the bracket shown in FIG. 10. FIG. 12 is a perspective view showing the internal configuration of the monitor casing with the monitor of the electronic device body shown in FIG. 11 kept open. FIG. 13 is a perspective view showing the cover connectable to the electronic device body shown in FIG. 11. FIG. 14 is a sectional view showing the configuration of the monitor opening and closing detection lever taken along the line XIV-XIV in FIG. 12. FIG. 15 is a sectional view showing the male engaging part of the cover attaching and detaching mechanism taken along the line XV-XV in FIG. 12. FIG. 16 is a sectional view showing the female engaging part of the cover attaching and detaching mechanism taken along the line XVI-XVI in FIG. 13.

The same reference numerals as the conventional on-vehicle display monitor shown in FIG. 17 and FIG. 18 and that of the first embodiment indicate the same components, and therefore descriptions thereof are omitted for brevity's sake.

The first feature of the second embodiment is in that the monitor opening and closing detection lever 50, an integrally molded resin element, is used. The monitor opening and closing detection lever 50 is, as shown in FIG. 14, a generally U-shaped single member integrally molded with a base 50*a* rotatably supported by a rotating shaft 43, a first lever (first abutting part) 50*b* that extends from the base 50*a* and abuts against the TV monitor 7, and a second lever 50*c* (second abutting part) that extends from the base 50*a* and abuts against a power switch (not shown in FIG. 14). A bending peculiar to the resin which acts on both of the first lever 50*b* and the second lever 50*c* is used for adjusting the clearance between the first lever and the second lever of the monitor opening and closing detection lever 50 and absorbing a shock.

The second feature of the second embodiment is in that the cover 60 that covers the electronic device body 3 is further provided. The cover 60 is, as shown in FIG. 13, generally composed of a cover body 61 that covers an operating part 9 of the electronic device body 3, a generally rectangular monitor opening 62, formed within the cover body 61, for securing a space for housing therein the TV monitor 7, and an operation opening 63 corresponding to a push button 15 and the like in the operating part 9. As shown in FIG. 13 and FIG. 16, in the cover body 61, a pair of fitting holes 64 are formed in an wall 61*a* facing to the monitor opening 62.

On the other hand, as shown in FIG. 12 and FIG. 15, in the operating part 9 of the electronic device body 3, a pair of elastic sections 65, broken away from a part of the wall, are formed on the wall 9*a* that abuts against the TV monitor 7. A fitting pawl 66 fittable into the fitting hole 64, is provided on each of the elastic sections 65. Here, the fitting hole 64, the elastic section 65, and the fitting pawl 66 constitute a cover attaching and detaching mechanism 67.

Moreover, as shown in FIG. 12 and FIG. 15, in monitor casing 6 of the electronic device body 3, a pair of engaging burs 68 are provided in an edge adjacent to a rotating shaft 11. On the other hand, as shown in FIG. 16, in the cover body 61, an engaging pawl 69 that is able to engage with the engaging bar 68 is provided on the edge of the cover body 61. In addition, a concavity 70 opened around the rotating shaft 11 of the monitor casing 6 is formed in the vicinity of the engaging pawl 69.

The operation of the on-board display monitor of the second embodiment will now be described below.

When putting the cover 60 on the electronic device body 3, the cover body 61 is put on the operating part 9 side while rotating the cover body after the engaging pawl 69 of the cover body 61 has engaged with the engaging bar 68 of the monitor casing 6. At this time, the engaging pawl 66 of the operating part 9 is engaged with the engaging hole 64 of the cover body 61 with the help of the elastic force of the elastic section 65. By going through the above procedures, the covering operation for covering the electronic device body 3 with the cover 60 is completed.

Subsequently, when detaching the cover 60 from the electronic device body 3, the fitting pawl 66 is thrust to go away the fitting pawl 66 from the fitting hole 64, and under such condition the cover body 61 is rotated around the fitting pawl 69. By going through the above procedures, the detaching operation is completed.

In addition, in order to reduce the weight of the bracket while maintaining the mechanical strength thereof, the bracket 2 in the second embodiment has the increased number of openings over the bracket 2 in the first embodiment. That is, as shown in FIG. 10, a generally cross opening 2*g* is formed on a monitor mounting part 2*b*, a first supporting part 2*c*, and a second supporting part 2*d*, a generally rectangular openings 2*h*, 2*i* are formed in the first supporting part 2*c*, and generally rectangular openings 2*j*, 2*k* are formed in the second supporting part 2*d*.

As mentioned above, according to the second embodiment, the monitor opening and closing lever 50 is a generally U-shaped single member that is integrally molded with the base 50*a* rotatably supported by the rotating shaft 43, the first lever 50*b* that extends from the base 50*a* and abuts against the TV monitor 7, and the second lever 50*c* that extends from the base 50*a* and abuts against the power switch 45, the second lever 50*c* being stopped by abutting it against the abutment surface 3*a* of the electronic device body 3. This intercepts the shock transmission to the power switch 45, and securely prevents the occurrence of a contact failure caused by the deformations of the substrate, the terminal and the like of the power switch 45. Moreover, even if the position where the TV monitor 7 abuts against the first lever 50*b* is changed due to the positional tolerance of the parts, the elastic force of the monitor opening and closing detection lever 50 absorbs a change in the pushing amount of the parts caused by the positional tolerance. This securely presses the power switch 45, even if the abutting position goes away from or up to the reference position. Additionally, since the first lever 50*b* and the second lever 50*c* are integrally molded with each other, additional parts such as the spring 47 used in the first embodiment are not necessary, which reduces the manufacturing cost.

Since in the second embodiment the temporary clamping structure for electronics is arranged such that the structure further includes the cover 60 that covers the electronic device body 3, and these cover 60 and the electronic device body 3 include the cover attaching and detaching mechanism 67, the attachment and detachment of the cover 60 to the electronic device body 3 can be easily done by using the cover attaching and detaching mechanism 67.

In addition, while in the illustrated Embodiments the case where the on-vehicle display monitor as an electronic device is clamped to the ceiling surface of the passenger room of a vehicle is described, the temporary clamping structure for electronics of the present invention may be applicable to the case where the electronic device is clamped to the ceiling surfaces of other movable bodies such as a train and a ship, or of a building.

What is claimed is:

1. A temporary clamping structure for electronics comprising:
    a bracket, a first surface of which is fastened to a side in an interior of a room, comprising:
        first protrusions disposed on and extending away from a second surface of the bracket, disposed opposite the first bracket surface, in a projecting direction substantially perpendicular the second bracket surface, and
        one of a first fitting concavity or convexity formed in each first protrusion; and
    a body of an electronic device connected to the side in the interior of the room by being fixed to the second surface of the bracket, comprising:
        a casing which supports the electronic device body and comprises a first casing surface facing the bracket and a second casing surface opposite the first casing surface and facing the interior of the room,
        second protrusions disposed on and extending away from the second casing surface in a direction substantially perpendicular the second casing surface,
        openings formed in the casing adjacent each second protrusion which each opening matches a corresponding first protrusion, and one of a second fitting convexity or concavity formed in each second protrusion, wherein:

each first protrusion is being inserted into the corresponding matching opening in the projecting direction substantially parallel each corresponding second protrusion to mate one of each first fitting convexity with each second fitting concavity or each first fitting concavity with each second fitting convexity to fasten the first casing surface to the second bracket surface.

2. The temporary clamping structure for electronics according to claim 1, wherein the bracket comprises a sheet metal member having formed thereon the first protrusion with the first fitting concavities, and the electronic device body comprises an elastic resin member integrally molded with the second protrusions and the second fitting convexities.

3. The temporary clamping structure for electronics according to claim 2, wherein a distance from a tip end of the second protrusion to the second fitting convexity is longer than a distance from a tip end of the first protrusion to the first fitting concavity.

4. The structure according to claim 3, wherein the second bracket surface and the first casing surface are disengaged by applying inward force to the tip ends of the second protrusions to detach the electronic device body from the bracket.

5. The temporary clamping structure for electronics according to claim 1, wherein the electronic device body has a monitor opening and closing mechanism for holding and releasing the monitor.

6. The temporary clamping structure for electronics according to claim 1, wherein the first and second protrusions extend in the projecting direction toward a shared point.

7. The temporary clamping structure for electronics according to claim 1, wherein the first and second protrusions extend forwardly in the projecting direction.

8. The temporary clamping structure for electronics according to claim 1, wherein the electronic device comprises a monitor.

9. The temporary clamping structure for electronics according to claim 1, wherein the electronic device comprises a television device.

10. The temporary clamping structure for electronics according to claim 1, wherein the projecting direction is a direction away from the side in the interior of the room to which the bracket is fastened.

11. The temporary clamping structure for electronics according to claim 10, wherein the projecting direction is one of downward, upward, leftward or rightward direction, the direction being dependent on the side of the room to which the bracket is fastened.

12. A temporary clamping structure for electronics comprising:

a bracket fastened to a side in an interior of a room, comprising:

a first surface facing the side of the interior of the room, a second surface opposite the first surface, first protrusions disposed on and extending away from the second surface, and one of a first fitting concavity or convexity formed in each first protrusion; and a body of an electronic device connected to the side in the interior of the room by being fixed on the bracket, comprising:

a casing which supports the electronic device body and comprises a first casing surface facing the bracket and a second casing surface opposite the first casing surface and facing the interior of the room, second protrusions disposed on and extending away from the second casing surface, openings formed in the casing adjacent each second protrusion which each opening matches a corresponding first protrusion, and one of a second fitting convexity or concavity formed in each second protrusion, wherein each first protrusion is being inserted into the corresponding matching opening to engage one of each first fitting convexity with each second fitting concavity or each first fitting concavity with each second fitting convexity to fasten the first casing surface to the second bracket surface.

13. The temporary clamping structure for electronics according to claim 12, wherein the electronic device body has a monitor opening and closing mechanism for holding and releasing the monitor.

14. The temporary clamping structure for electronics according to claim 12, wherein the bracket comprises a sheet metal member having formed thereon the first protrusions with the first fitting concavities, and the electronic device body comprises an elastic resin member integrally molded with the second protrusions and the second fitting convexities.

15. The temporary clamping structure for electronics according to claim 14, wherein a distance from a tip end of the second protrusion to the second fitting convexity is longer than a distance from a tip end of the first protrusion to the first fitting concavity.

16. The structure according to claim 15, wherein the second bracket surface and the first casing surface are disengaged by applying inward force to the tip ends of the second protrusions to detach the electronic device body from the bracket.

17. A temporary clamping structure for an on-vehicle monitor, comprising:

a bracket fastened to a side of an interior of a passenger compartment of the vehicle, comprising:

a pair of first protrusions disposed on opposite sides of and extending away from a bracket surface, and a concavity formed in each first protrusion; and a casing which supports the monitor and comprises:

a pair of second protrusions disposed on opposite sides of and extending away from a casing surface, openings formed in the casing adjacent each second protrusion which each opening matches a corresponding first protrusion, and a convexity formed in each second protrusion, wherein:

each first protrusion is being inserted into the corresponding matching opening to engagingly mate each concavity with each convexity, each convexity extending outward from the corresponding concavity to fasten the casing to the bracket and the first and second protrusions are being aligned to project toward the passenger compartment and away from the side of the interior to which the bracket is fastened.

18. The structure according to claim 17, wherein each aligned second protrusion is longer than the corresponding first protrusion to expose a tip.

19. The structure according to claim 18, wherein the casing is detached from the bracket by applying force to the tips of the second protrusions in an inward direction.

* * * * *